US009967137B2

(12) United States Patent
Lim

(10) Patent No.: US 9,967,137 B2
(45) Date of Patent: May 8, 2018

(54) SYSTEM AND METHOD FOR PROTECTING VIRTUAL CIRCUITS IN DYNAMIC MULTI-DOMAIN ENVIRONMENT

(71) Applicant: KOREA INSTITUTE OF SCIENCE & TECHNOLOGY INFORMATION, Daejeon (KR)

(72) Inventor: Huhnkuk Lim, Daejeon (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 0 days. days.

(21) Appl. No.: 15/325,583

(22) PCT Filed: Aug. 12, 2015

(86) PCT No.: PCT/KR2015/008436
§ 371 (c)(1),
(2) Date: Jan. 11, 2017

(87) PCT Pub. No.: WO2016/024807
PCT Pub. Date: Feb. 18, 2016

(65) Prior Publication Data
US 2017/0141957 A1  May 18, 2017

(30) Foreign Application Priority Data
Aug. 13, 2014 (KR) .................. 10-2014-0105152

(51) Int. Cl.
*G06F 15/173* (2006.01)
*H04L 12/24* (2006.01)
*H04L 12/46* (2006.01)

(52) U.S. Cl.
CPC ...... *H04L 41/0803* (2013.01); *H04L 12/4641* (2013.01)

(58) Field of Classification Search
CPC ................ H04L 12/4641; H04L 41/0803
(Continued)

(56) References Cited

U.S. PATENT DOCUMENTS 7,388,872 B2 * 6/2008 Montgomery, Jr. .... H04J 3/085
370/404
2009/0109869 A1 * 4/2009 Hsiao ................ H04L 12/4641
370/254
2014/0056125 A1 * 2/2014 Guellal .................. H04L 45/28
370/225

FOREIGN PATENT DOCUMENTS

KR   10-2011-0090905 A   8/2011
KR   10-2012-0107728 A   10/2012
(Continued)

OTHER PUBLICATIONS

Lim H, Test for Resource Service by the User Web Portal and the NSI based Network Resource Service Agent, The Journal of the Korea Institute of Communication Sciences, 2012, pp. 822-830, vol. 9, Korea Institute of Communication Sciences, Korea.
(Continued)

*Primary Examiner* — Phuoc Nguyen
(74) *Attorney, Agent, or Firm* — STIP Law Group, LLC

(57) ABSTRACT

The present invention relates to a system and method for protecting a virtual circuit in a dynamic multi-domain environment, the system comprising: a request agent (RA) for transmitting, if a network service is requested from a user terminal, a network resource allocation request signal for providing the requested network service to a global network service agent (NSA); the global network service agent (NSA) for managing at least one or more provider NSAs existing in one composition domain and managing data plane status information of primary/backup virtual circuits of each domain on the basis of information received from the at least one or more provider NSAs; and the at least one or
(Continued)

more provider NSAs for configuring, according to reception of the network resource allocation request signal, a network device and the primary and backup virtual circuits, monitoring whether a failure occurs in the configured virtual circuits and network device, and transmitting link/node failure/recovery information and protection/regeneration success/failure information to the global NSA.

10 Claims, 4 Drawing Sheets

(58) Field of Classification Search
USPC .................................................. 709/223, 246
See application file for complete search history.

(56) References Cited

FOREIGN PATENT DOCUMENTS

| KR | 10-2014-0092688 A | 7/2014 |
| KR | 10-2014-0099193 A | 8/2014 |

OTHER PUBLICATIONS

International Search Report of PCT/KR2015/008436, dated Nov. 17, 2015.

* cited by examiner

SYSTEM AND METHOD FOR PROTECTING VIRTUAL CIRCUITS IN DYNAMIC MULTI-DOMAIN ENVIRONMENT

CROSS-REFERENCE TO RELATED APPLICATIONS

This application is the U.S. National Phase under 35 U.S.C. § 371 of International Application No. PCT/KR2015/008436 filed on Aug. 12, 2015, which in turn claims the benefit of Korean Application No. 10-2014-0105152, filed on Aug. 13, 2014, the disclosures of which are incorporated by reference into the present application.

BACKGROUND OF THE INVENTION

Field of the Invention

The present invention relates to a system and method for protecting a virtual circuit in a dynamic multi-domain environment, and more specifically, to a protection management system for a user-based virtual circuit service based on a Network Service Interface (NSI) framework in a dynamic multi-domain environment.

Background of the Related Art

As demands on information systems increase recently, cost of information technology (IT) and scales of the information systems exponentially increase across the world. Increase in the cost of information systems enhances interests in efficiency of investments on IT, and various techniques are proposed to solve the problem of investment efficiency, and virtualization techniques for efficiently using resources by logically integrating physically different systems or logically dividing one system into different systems are spotlighted as an important technique for enhancing efficiency of investments on IT.

Network virtualization is a concept of the virtualization technique, in which a plurality of logically separated networks may coexist on the basis of shared network devices, and it can be implemented through a virtual router mechanism and virtual links. Particularly, the virtual router mechanism may reduce the cost and provides flexibility of management since additional installation of physical network nodes is not needed through addition of logical network nodes.

Meanwhile, a conventional technique of protecting a virtual circuit in a multi-domain is a technique only provided by a manager in a static multi-domain environment. Accordingly, there are many restrictions in the user-based virtual circuit protection management in a dynamic multi-domain environment. A technique for a user-based virtual circuit protection service in a dynamic multi-domain environment has not been introduced until present, and common standardization for providing a user-based protection management service in a dynamic multi-domain environment also has not been progressed until present.

SUMMARY OF THE INVENTION

Therefore, the present invention has been made in view of the above problems, and it is an object of the present invention to provide a system and method for protecting a virtual circuit in a dynamic multi-domain environment, which can recognize and update link or node failure information and protection success/failure information generated in one composition domain of the dynamic multi-domain environment, network node/link status information configuring a dynamic multi-domain, and primary/backup virtual circuit status information.

Another object of the present invention is to provide a design of reliable user-based protection management messages and a message flow mechanism in a common standard interface for controlling network resources, such as a NSI (Network Service Interface), in order to provide a reliable user-based protection management function among dynamic multiple domains.

Still another object of the present invention is to provide a technique of mounting the functions that should be supported for user-based protection management service among multiple domains on a Network Provisioning System (NPS) which controls virtual circuit service in each composition domain.

To accomplish the above objects, according to one aspect of the present invention, there is provided a system for protecting a virtual circuit in a dynamic multi-domain environment, the system including: a request agent (RA) for transmitting, if a network service is requested from a user terminal, a network resource allocation request signal for providing the requested network service to a global network service agent (NSA); the global network service agent (NSA) for managing at least one or more provider NSAs existing in one composition domain and managing data plane status information of primary/backup virtual circuits of each domain on the basis of information received from the at least one or more provider NSAs; and the at least one or more provider NSAs for configuring, according to reception of the network resource allocation request signal, a network device and the primary and backup virtual circuits, monitoring whether a failure occurs in the configured virtual circuits and network device, and transmitting link/node failure/recovery information and protection/regeneration success/failure information to the global NSA.

The system for protecting a virtual circuit in a dynamic multi-domain environment may further include an application NSA for updating, if the data plane status information of the primary/backup virtual circuits according to network node/link failure/recovery of a composition domain is received from the global NSA, the data plane status information of the primary/backup virtual circuits configuring the entire multi-domain on the basis of the received data plane status information.

The global NSA may transmit the link or node failure/recovery information and the protection/regeneration success/failure information to the RA, and the RA may manage primary/backup virtual circuit status information configuring a dynamic multi-domain through the link or node failure/recovery information and the protection/regeneration success/failure information.

According to another aspect of the present invention, there is provided a method of protecting a virtual circuit in a dynamic multi-domain environment, the method including the steps of: transmitting, if a network service is requested from a user terminal, a network resource allocation request signal for providing the requested network service to a corresponding provider NSA (network service agent) through a global NSA, by an RA; configuring, according to reception of the network resource allocation request signal, a network device and primary and backup virtual circuits and monitoring whether a failure occurs in the configured virtual circuits and network device, by the provider NSA; transmitting link/node failure or recovery information and protection/regeneration success or failure information to the global NSA according to a result of the monitoring, by the provider NSA; and managing data plane status information of primary/backup virtual circuits of each domain on the basis of the information received from the provider NSA, by the global NSA.

The method of protecting a virtual circuit in a dynamic multi-domain environment may further include the steps of: transmitting the link or node failure/recovery information and the protection/regeneration success/failure information to the RA, by the global NSA; and managing primary/backup virtual circuit status information configuring a dynamic multi-domain through the link or node failure/recovery information and the protection/regeneration success/failure information, by the RA.

According to still another aspect of the present invention, there is provided a system for protecting a virtual circuit in a dynamic multi-domain environment, the system including: a request agent (RA) for transmitting, if a network service is requested from a user terminal, a network resource allocation request signal for providing the requested network service to a global network service agent (NSA); the global network service agent (NSA) for managing at least one or more provider NSAs existing in one composition domain, receiving at least one of link/node failure information, protection success/failure information and transmission path switching control information of each composition domain from the at least one or more provider NSAs, and recognizing and updating network node/link status information and primary/backup virtual circuit status information configuring a dynamic multi-domain on the basis of the received information; and the at least one or more provider NSAs for configuring, according to reception of the network resource allocation request signal, a network device and primary and backup virtual circuits, monitoring whether a failure occurs in the configured virtual circuits and network device, and transmitting at least one of the link/node failure information, the protection success/failure information and the transmission path switching control information of each composition domain to the global NSA if a failure occurs.

The system for protecting a virtual circuit in a dynamic multi-domain environment may further include an application NSA for recognizing and updating, if at least one of the link/node failure information, the protection success/failure information and the transmission path switching control information of each composition domain is received from the global NSA, the network node/link status information and the primary/backup virtual circuit status information configuring the dynamic multi-domain on the basis of the received information.

According to still another aspect of the present invention, there is provided a method of protecting a virtual circuit in a dynamic multi-domain environment, the method including the steps of: (a) transmitting, if a network service is requested from a user terminal, a network resource allocation request signal for providing the requested network service to a corresponding provider NSA (network service agent) through a global NSA, by an RA; (b) configuring, according to reception of the network resource allocation request signal, a network device and primary and backup virtual circuits and monitoring whether a failure occurs in the configured virtual circuits and network device, by the provider NSA; (c) transmitting, if a network device or link/node failure occurs, a link/node failure information message to the global NSA, switching a transmission path to a protection network device of the network device, and transmitting a transmission path protection success information message to the global NSA, by the provider NSA; and (d) switching a transmission path of another provider NSA connected to the provider NSA to the protection network device, and transmitting a transmission path protection success information message to an application NSA, by the global NSA.

Step (c) may include the steps of: transmitting, if a network device or link/node failure occurs, a link/node failure information message to the global NSA, by the provider NSA; transmitting a link/node failure information reception confirmation message to the provider NSA and transmitting the link/node failure information message to the application NSA, by the global NSA; and switching a transmission path to a protection network device of the network device and transmitting, if a transmission path protection success notification is received from the protection network device, a transmission path protection success information message to the global NSA, by the provider NSA.

The application NSA receiving the link/node failure information message from the global NSA recognizes and updates network node/link status information configuring a dynamic multi-domain through the link/node failure information message and transmits a link failure information reception confirmation message to the global NSA.

DETAILED DESCRIPTION OF THE PREFERRED EMBODIMENT

Figure 1:
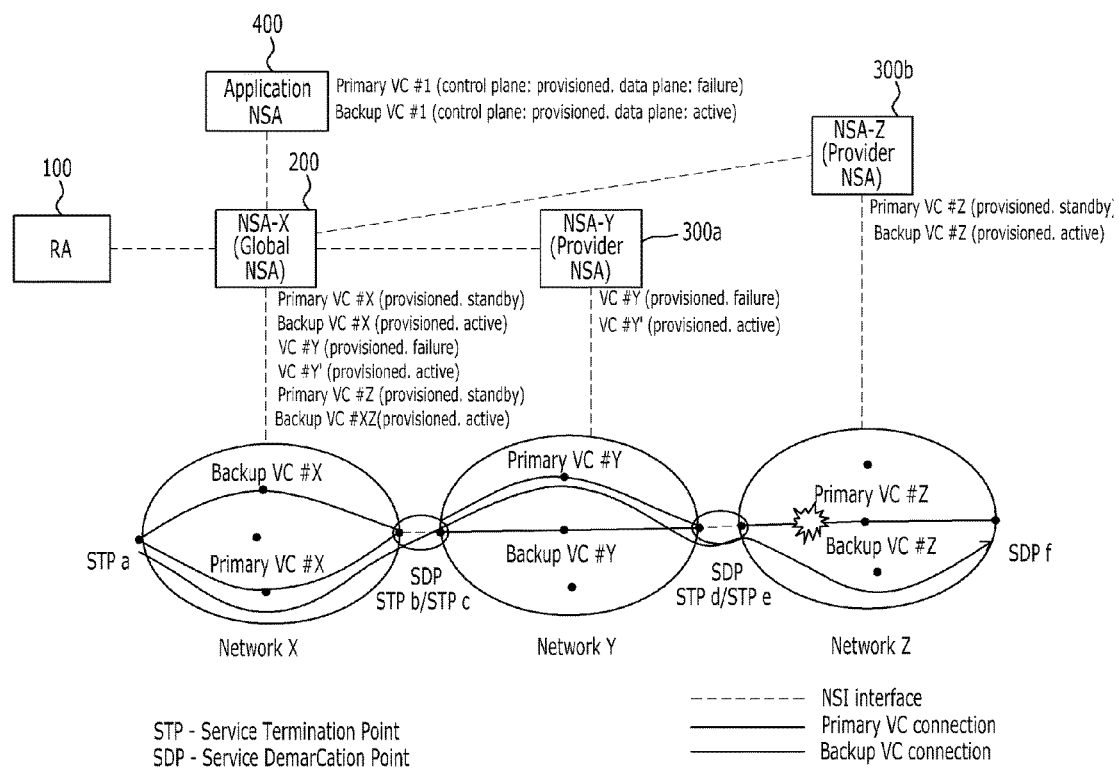
FIG. 1 is a view showing a per-domain protection management concept for a guaranteed user-based virtual circuit service in a dynamic multi-domain environment according to an embodiment of the present invention.

Hereinafter, 'a system and method for protecting a virtual circuit in a dynamic multi-domain environment' according to the present invention will be described in detail with reference to the accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily and hence may be different from actually embodied forms.

Meanwhile, the constitutional components expressed below are merely examples for implementing the present invention. Accordingly, other constitutional components may be used in other implementations of the present invention without departing from the spirit and scope of the present invention. In addition, although each constitutional component may be implemented only in a pure hardware or software configuration, it also can be implemented by combining various hardware or software configurations performing the same function. In addition, two or more constitutional components may be implemented together by one-piece of hardware or software.

In addition, the expression of 'including' a component is an expression of an 'open type' which merely refers to existence of a corresponding component, and it should not be construed as precluding additional components.

FIG. 1 is a view showing a per-domain protection management concept for a guaranteed user-based virtual circuit service in a dynamic multi-domain environment according to an embodiment of the present invention.

Referring to FIG. 1, a per-domain protection management system for a guaranteed user-based virtual circuit service in a dynamic multi-domain environment includes a request agent (RA) 100, at least one or more provider network service agents (NSA) 300a and 300b, a global network service agent (NSA) 200 and an application NSA 400.

If a network service is requested from a user terminal, the RA 100 may transmit a network resource allocation request signal for providing the requested network service to the global NSA 200.

The RA 100 transmits a virtual circuit status information request signal to the global NSA 200, receives link/node failure/recovery information and protection/regeneration success/failure information from the global NSA 200 as a result, and manages status information of each of primary/backup virtual circuits configuring a dynamic multi-domain through the received information.

If the network resource allocation request signal is received from the RA 100, the global NSA (NSA-X) 200 transmits the received signal to a corresponding provider NSA 300a or 300b. At this point, the global NSA 200 selects a provider NSA for a corresponding network service on the basis of network resources of the provider NSAs 300a and 300b and transmits the network resource allocation request signal to the selected provider NSA.

The global NSA 200 manages a plurality of provider NSAs 300a and 300b existing in one composition domain, receives link/node failure/recovery information and protection/regeneration success/failure information from each of the provider NSAs 300a and 300b being managed, and manages data plane status information of the primary/backup virtual circuits of each domain on the basis of the received information.

For example, if link/node failure information is not received from the NSA-Y 300a, the global NSA (NSA-X) 200 manages data plane status information of the primary/backup virtual circuits of the NSA-Y 300a, like the primary VC #Y(provisioned, active) and backup VC #Y(provisioned, standby). In addition, if link/node failure/recovery information is received from the NSA-Z 300b, the global NSA (NSA-X) 200 manages data plane status information of the primary/backup virtual circuits of the NSA-Z 300b, like the primary VC #Z(provisioned, failure) and backup VC #Z(provisioned, active).

The global NSA 200 transmits the data plane status information of the primary/backup virtual circuits of each domain to the application NSA 400.

If the network resource allocation request signal is received from the global NSA 200, the provider NSA 300a or 300b configures a network device and primary and backup virtual circuits, monitors whether a failure occurs in the configured virtual circuits and network device, and transmits link/node failure/recovery information and protection/regeneration success/failure information to the global NSA 200 if a failure occurs.

The provider NSA 300a or 300b is in charge of virtual circuit control of each domain and notifies the link/node failure/recovery information and the protection/regeneration success/failure information to the global NSA 200 to perform per-domain protection. In this manner, the global NSA 200 may manage the data plane status information of the primary/backup virtual circuits of each domain.

If the data plane status information of the primary/backup virtual circuits according to network node/link failure/recovery of a composition domain is received from the global NSA 200, the application NSA 400 updates the data plane status information of the primary/backup virtual circuits configuring the entire multi-domain on the basis of the received data plane status information.

The application NSA 400 manages the data plane status information of the primary/backup virtual circuits configuring the entire multi-domain, like the primary VC #1(control plane: provisioned, data plane: failure), backup VC #1(control plane: provisioned, data plane: active). Here, the primary VC #1 is configured of primary VC #X of domain X, primary VC #Y of domain Y, and primary VC #Z of domain Z, and the backup VC #1 is configured of backup VC #X of domain X, backup VC #Y of domain Y, and backup VC #Z of domain Z. Accordingly, the application NSA 400 recognizes data plane status of the component VCs existing in the multi-domain and manages the data plane status information reflecting the status.

Figure 2:
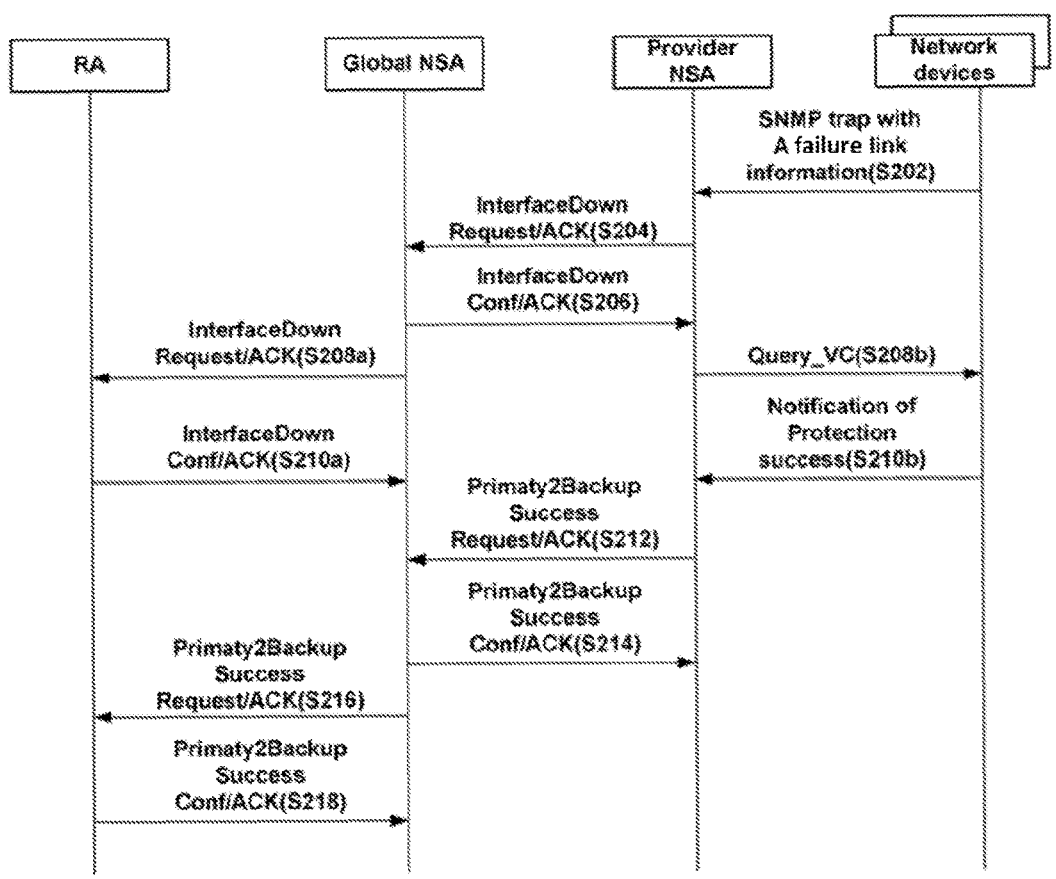
FIG. 2 is a view showing a per-domain protection management method for a guaranteed user-based virtual circuit service in a dynamic multi-domain environment according to an embodiment of the present invention.

FIG. 2 is a view showing a per-domain protection management method for a guaranteed user-based virtual circuit service in a dynamic multi-domain environment according to an embodiment of the present invention.

Referring to FIG. 2, if link failure information is received from a network device in which primary/backup virtual circuits are configured (step S202), the provider NSA transmits a link failure information message (interfaceDownRequest/ACK) to the global NSA (step S204). Here, the link failure information message may include network device identification information, provider NSA identification information and the like.

The global NSA transmits a link failure information reception confirmation message (interfaceDownConf/ACK) to the provider NSA (step S206). At this point, the global NSA transmits a link failure information message (interfaceDownRequest/ACK) to the RA (step S208a), and the RA transmits a link failure information reception confirmation message (interfaceDownConf/ACK) to the global NSA (step S210a).

The provider NSA queries a network device and a configured virtual circuit to confirm whether primary/backup virtual circuit protection has been succeeded (step S208b), and if a primary/backup virtual circuit protection success notification is received from the network device (step S210b), the provider NSA transmits a protection success information message (Primary2BackupSuccessRequest/ACK) informing success of protection from the primary virtual circuit to the backup virtual circuit to the global NSA (step S212).

The global NSA transmits a protection success information reception confirmation message (Primary2BackupSuccessConf/ACK) to the provider NSA (step S214).

Then, the global NSA transmits the protection success information message (Primary2BackupSuccessRequest/ACK) to the RA (step S216) to inform the RA of success of the virtual circuit protection, and the RA transmits a protection success information reception confirmation message (Primary2BackupSuccessConf/ACK) to the global NSA (step S218).

Figure 3:
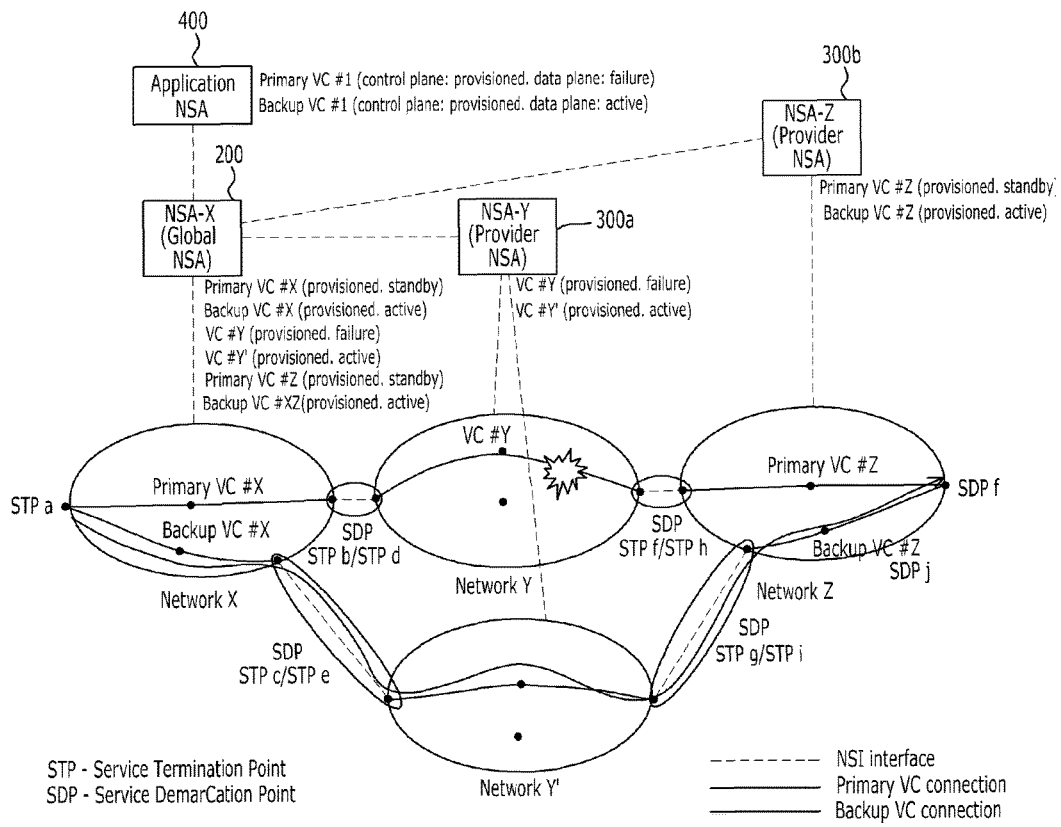
FIG. 3 is a view showing an end-to-end protection management concept for a guaranteed user-based virtual circuit service in a dynamic multi-domain environment according to an embodiment of the present invention.

FIG. 3 is a view showing an end-to-end protection management concept for a guaranteed user-based virtual circuit service in a dynamic multi-domain environment according to an embodiment of the present invention.

Referring to FIG. 3, this is an end-to-end protection management scenario considering a diverse path in a multi-domain environment, and it is assumed that domain Y uses domain Y' as a protection domain.

In the case of end-to-end protection, if a fault occurs in a network device (e.g., a gateway router (node)) of an adjacent domain, protection cannot be supported within the adjacent domain. A protection domain different from the primary domain is separately prepared so that a diverse path may be considered to overcome such a situation.

If a link/node failure/recovery is performed within a composition domain for performing end-to-end protection management, management of network topology, management of data plane status of the primary/backup virtual circuits and implementation of an information message for organization of a transmission path are needed.

If a network resource allocation request signal is received from an RA (not shown), the global NSA (NSA-X) 200 transmits the received signal to a corresponding provider NSA 300a or 300b. At this point, the global NSA 200 selects a provider NSA for a corresponding network service on the basis of network resources of the provider NSAs 300a and 300b and transmits the network resource allocation request signal to the selected provider NSA.

The global NSA 200 manages a plurality of provider NSAs 300a and 300b existing in a composition domain, receives link/node failure information, protection success/failure information and transmission path switching control information of each composition domain from each of the managed provider NSAs 300a and 300b being managed, and recognizes and updates network node/link status information and primary/backup virtual circuit status information configuring a dynamic multi-domain on the basis of the received information. That is, the global NSA 200 recognizes and updates the network node/link status information and the primary/backup virtual circuit status information configuring a dynamic multi-domain through the link/node failure information and the protection success/failure information generated in one composition domain and the transmission path switching control information of each composition domain.

The global NSA 200 transmits the link/node failure information, the protection success/failure information and the transmission path switching control information of each composition domain received from each of the provider NSAs 300a and 300b to the application NSA 400. In addition, the global NSA 200 transmits the transmission path switching control information of each composition domain to a corresponding provider NSA.

If the network resource allocation request signal is received from the global NSA 200, the provider NSA 300a or 300b configures a network device and primary and backup virtual circuits, monitors whether a failure occurs in the configured virtual circuits and network device, and transmits link/node failure information, protection success/failure information and the transmission path switching control information to the global NSA 200 if a failure occurs.

The provider NSA 300a or 300b is in charge of virtual circuit control of each domain and transmits the link/node failure information and the protection success/failure information generated in one composition domain and the transmission path switching control information of each composition domain to the global NSA 200.

If the link/node failure information, the protection success/failure information, the transmission path switching control information and the like of each composition domain are received from the global NSA 200, the application NSA 400 recognizes and updates the network node/link status information and the primary/backup virtual circuit status information configuring the dynamic multi-domain on the basis of the received information.

The application NSA 400 manages the data plane status information of the primary/backup virtual circuits configuring the entire multi-domain, like the primary VC #1(control plane: provisioned, data plane: failure), backup VC #1(control plane: provisioned, data plane: active). Here, the primary VC #1 is configured of primary VC #X of domain X, primary VC #Y of domain Y, and primary VC #Z of domain Z, and the backup VC #1 is configured of backup VC #X of domain X, backup VC #Y of domain Y, and backup VC #Z of domain Z. Accordingly, the application NSA 400 recognizes data plane status of the component VCs existing in the multi-domain and manages the data plane status information reflecting the status.

Figure 4:
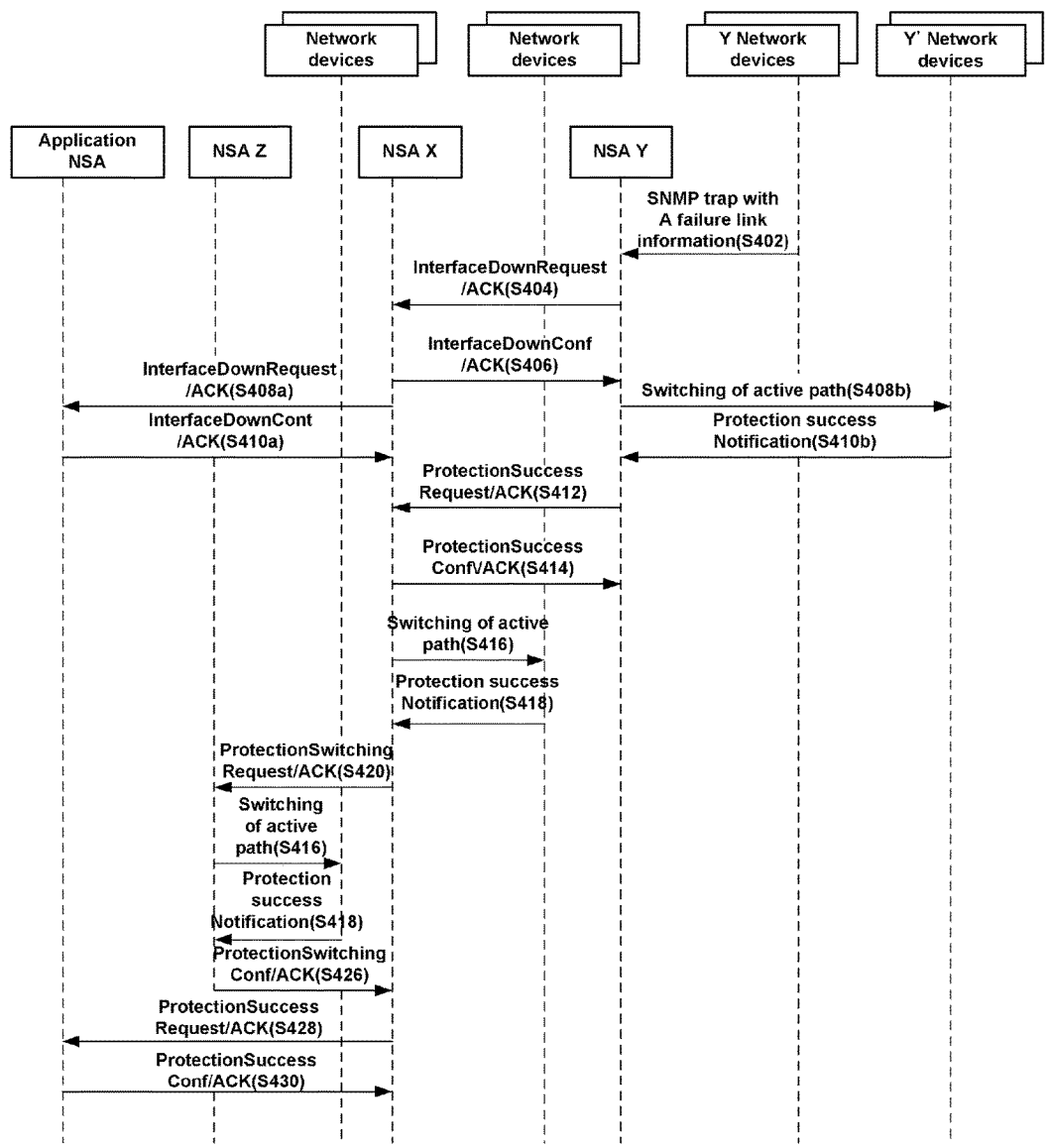
FIG. 4 is a view showing an end-to-end protection management method for a guaranteed user-based virtual circuit service in a dynamic multi-domain environment according to an embodiment of the present invention.

FIG. 4 is a view showing an end-to-end protection management method for a guaranteed user-based virtual circuit service in a dynamic multi-domain environment according to an embodiment of the present invention.

Referring to FIG. 4, if link failure information is received from network device Y in which a primary virtual circuit is configured (step S402), the NSA-Y (provider NSA) transmits a link failure information message (interfaceDownRequest/ACK) to the NSA-X (global NSA) (step S404). Here, the link failure information message may include network device identification information, provider NSA identification information and the like.

The NSA-X (global NSA) transmits a link failure information reception confirmation message (interfaceDownConf/ACK) to the NSA-Y (provider NSA) (step S406). At this point, the NSA-X (global NSA) transmits a link failure information message (interfaceDownRequest/ACK) to the application NSA (step S408a), and the application NSA transmits a link failure information reception confirmation message (interfaceDownConf/ACK) to the NSA-X (global NSA) (step S410a). In this manner, the application NSA recognizes and updates the network node/link status information configuring a dynamic multi-domain.

The NSA-Y (provider NSA) receiving the link failure information reception confirmation message (interfaceDownConf/ACK) switches the transmission path to network device Y', which is a protection domain of network device Y, (step S408b), and if a transmission path protection success notification is received from network device Y' (step S410b), the NSA-Y transmits a transmission path protection success information message (ProtectionSucessRequest/ACK) informing success of protection from network device Y to network device Y' to the NSA-X(global NSA) (step S412).

The NSA-X (global NSA) transmits a transmission path protection success information reception confirmation message (ProtectionSucessConf/ACK) to the NSA-Y (provider NSA) (step S414) and switches the transmission path of network device X from network device Y to network device Y' (step S416).

Then, if the transmission path protection success notification is received from network device X (step S418), the NSA-X (global NSA) transmits a transmission path switching control information message (ProtectionSwitchingRequest/ACK) to the NSA-Z (provider NSA) (step S420).

The NSA-Z (provider NSA) switches the transmission path of network device Z from network device Y to network device Y' (step S422), and if the transmission path protection success notification is received from network device Z (step S424), the NSA-Z (provider NSA) transmits a transmission path switching completion information message (ProtectionSwitchingConf/ACK) to the NSA-X (global NSA) (step S426).

If transmission path switching is completed up to the NSA-Z (provider NSA), the NSA-X (global NSA) transmits a transmission path protection success information message (ProtectionSucessRequest/ACK) to the application NSA (step S428), and the application NSA transmits a protection success information reception confirmation message (ProtectionSucessConf/ACK) to the NSA-X (global NSA) (step S430).

Such a method of protecting a virtual circuit in a dynamic multi-domain environment can be created as a computer program, and codes and code segments constituting the computer program may be easily reasoned by a programmer in the art. In addition, the method of protecting a virtual circuit in a dynamic multi-domain environment is stored in an information storage medium (Readable Media) that can be read by an electronic device and can be read and executed by the electronic device.

According to the present invention, since a protection management method based on a common standard interface is provided to provide and implement a reliable user-based protection management function in a dynamic multi-domain environment, link or node failure information and protection success/failure information generated in one composition domain, network node/link status information configuring a dynamic multi-domain, and primary/backup virtual circuit status information can be recognized and updated.

Further, this can be a reference model for reflecting a user-based reliable protection management function into a common standard interface, such as an NSI for user-based virtual circuit resource control, in a dynamic multi-domain environment.

Like this, those skilled in the art may recognize that the present invention can be embodied in other specific forms without departing from the spirit and essential characteristics of the present invention. Therefore, it should be understood that the embodiments described above are illustrative and not restrictive to limit the scope. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A system for protecting a virtual circuit in a dynamic multi-domain environment, the system comprising:
   a request agent (RA) transmitting a network resource allocation request signal for providing a network service to a global network service agent (NSA) when the network service is requested from a user terminal,
   the global managing at least one or more provider NSAs existing in one composition domain comprising at least one or more domains and managing data plane status information of primary or backup virtual circuits of each of the at least one or more domains in the composition domain on the basis of information received from the at least one or more provider NSAs,
   wherein the at least one or more provider NSAs configures, according to reception of the network resource allocation request signal, a network device and the primary and backup virtual circuits, monitors whether a failure occurs in the configured primary and backup virtual circuits and the network device, and transmits a node recovery information and/or a failure information to the global NSA and a success or failure information of protection or regeneration to the global NSA,
   wherein each of the RA and the at least one or more provider NSAs is implemented only in a hardware.

2. The system according to claim 1, further comprising an application NSA for updating the data plane status information of the primary or backup virtual circuits configuring the entire multi-domain on the basis of a received data plane status information when the data plane status information of the primary or backup virtual circuits according to the node recovery information and/or the failure information of the composition domain is received from the global NSA.

3. The system according to claim 1, wherein the global NSA transmits the node recovery information and failure information and the success or failure information of protection or regeneration to the RA, and the RA manages primary and backup virtual circuits status information configuring the dynamic multi-domain through the node recovery information and/or the failure information and the success or failure information of protection or regeneration.

4. A method of protecting a virtual circuit in a dynamic multi-domain environment, the method comprising the steps of:
   transmitting a network resource allocation request signal for providing a network service to a corresponding provider network service agent (NSA) through a global NSA by a request agent (RA) when the network service is requested from a user terminal, wherein each of the RA and the provider NSA is implemented only in a hardware;
   configuring, according to reception of the network resource allocation request signal, a network device and primary and backup virtual circuits and monitoring whether a failure occurs in the configured primary and backup virtual circuits and the network device, by the provider NSA;
   transmitting a node recovery information and/or the failure information and a success or failure information of protection or regeneration to the global NSA according to a result of the monitoring, by the provider NSA; and
   managing data plane status information of the primary or backup virtual circuits of each of at least one or more domains in a composition domain on the basis of the information received from the provider NSA, by the global NSA.

5. The method according to claim 4, further comprising the steps of:
   transmitting the node recovery information and/or the failure information and the success or failure information of protection or regeneration to the RA, by the global NSA; and
   managing primary and backup virtual circuits status information configuring the dynamic multi-domain through the node recovery information and/or the failure information and the success or failure information of protection or regeneration, by the RA.

6. A system for protecting a virtual circuit in a dynamic multi-domain environment, the system comprising:
   a request agent (RA) transmitting a network resource allocation request signal for providing a network service to a global network service agent (NSA) when the network service is requested from a user terminal, the global network service agent (NSA) managing at least one or more provider NSAs existing in a one composition domain, wherein the composition domain comprises multiple composition domains, receiving at least one of a node failure information, a success or failure information of protection and a transmission path switching control information of each composition domain from the at least one or more provider NSAs, and recognizing and updating network node status information and primary and backup virtual circuits status information configuring the dynamic multi-domain on the basis of the received information, wherein each of the RA and the at least one or more provider NSAs is implemented only in a hardware, wherein the at least one or more provider NSAs configures, according to reception of the network resource allocation request signal, a network device and primary and backup virtual circuits, monitors whether a failure occurs in the configured primary and backup virtual circuits and the network device, and transmits at least one of the node failure information, the success or failure information of protection and the transmission path switching control information of each composition domain to the global NSA when a failure occurs.

7. The system according to claim 6, further comprising an application NSA for recognizing and updating, when at least one of the node failure information, the success or failure information of protection and the transmission path switching control information of each composition domain is received from the global NSA, the network node status information and the primary and backup virtual circuits status information configuring the dynamic multi-domain on the basis of the received information.

8. A method of protecting a virtual circuit in a dynamic multi-domain environment, the method comprising the steps of:

(a) transmitting a network resource allocation request signal for providing a network service to a corresponding provider network service agent (NSA) through a global NSA when the network service is requested from a user terminal, by a request agent (RA), wherein each of the RA and the provider NSA is implemented only in a hardware;

(b) configuring, according to reception of the network resource allocation request signal, a network device and primary and backup virtual circuits and monitoring whether a failure occurs in the configured primary and backup virtual circuits and the network device, by the provider NSA;

(c) transmitting, if the network device or node failure occurs, a node failure information message to the global NSA, switching a transmission path to a protection network device of the network device, and transmitting a transmission path protection success information message to the global NSA, by the provider NSA; and (d) switching a transmission path of another provider NSA connected to the provider NSA to the protection network device, and transmitting a transmission path protection success information message to an application NSA, by the global NSA.

9. The method according to claim 8, wherein step (c) includes the steps of:

transmitting, if the network device or node failure occurs, a node failure information message to the global NSA, by the provider NSA;

transmitting a node failure information reception confirmation message to the provider NSA and transmitting the node failure information message to the application NSA, by the global NSA; and switching a transmission path to a protection network device of the network device and transmitting, if a transmission path protection success notification is received from the protection network device, a transmission path protection success information message to the global NSA, by the provider NSA.

10. The method according to claim 9, wherein the application NSA receiving the node failure information message from the global NSA recognizes and updates network node status information configuring a dynamic multi-domain through the node failure information message and transmits a link failure information reception confirmation message to the global NSA.

* * * * *